(12) United States Patent
Shibuya et al.

(10) Patent No.: US 11,385,389 B2
(45) Date of Patent: Jul. 12, 2022

(54) POLARIZING PLATE HAVING DISCONTINUOUS WATER-REPELLENT PORTION AND MANUFACTURING METHOD THEREOF

(71) Applicant: DEXERIALS CORPORATION, Tokyo (JP)

(72) Inventors: Kazuyuki Shibuya, Miyagi (JP); Shigeshi Sakabara, Miyagi (JP); Toshiaki Sugawara, Miyagi (JP); Yusuke Matsuno, Miyagi (JP); Akio Takada, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 282 days.

(21) Appl. No.: 16/601,672

(22) Filed: Oct. 15, 2019

(65) Prior Publication Data

US 2020/0132903 A1 Apr. 30, 2020

(30) Foreign Application Priority Data

Oct. 26, 2018 (JP) ............................. JP2018-202369

(51) Int. Cl.
*G02B 1/18* (2015.01)
*G02B 5/30* (2006.01)
(Continued)

(52) U.S. Cl.
CPC ............. *G02B 5/3008* (2013.01); *G02B 1/14* (2015.01); *G02B 1/18* (2015.01); *G02B 5/3058* (2013.01);
(Continued)

(58) Field of Classification Search
CPC .......... G02B 1/14; G02B 1/18; G02B 5/3008; G02B 5/3058; G02B 1/133548; G02F 1/133548
See application file for complete search history.

(56) References Cited

U.S. PATENT DOCUMENTS

| 2005/0163971 A1* | 7/2005 | Kobayashi | G02B 5/305 428/156 |
| 2009/0153961 A1* | 6/2009 | Murakami | G02B 5/3025 359/485.05 |

(Continued)

FOREIGN PATENT DOCUMENTS

JP 2012-103728 A 5/2012

*Primary Examiner* — Ryan S Dunning
(74) *Attorney, Agent, or Firm* — Oliff PLC

(57) ABSTRACT

Provided are a polarizing plate having excellent optical properties and durability, and a method for manufacturing the polarizing plate. The polarizing plate includes: a transparent substrate transparent to light in a used wavelength band; lattice-shaped protrusions arranged on the transparent substrate at a pitch shorter than the wavelength of light in the used wavelength band, extending in a predetermined direction, and having a reflective layer, a first dielectric layer, an absorbing layer, and a second dielectric layer in this order; a dielectric portion consisting of a dielectric discontinuously formed on a surface of the lattice-shaped protrusions and a surface of a bottom floor between the lattice-shaped protrusions; and a water-repellent portion formed on a surface of the dielectric portion and having water-repellent properties.

8 Claims, 6 Drawing Sheets

(51) Int. Cl.
G02F 1/1335 (2006.01)
G02B 1/14 (2015.01)
(52) U.S. Cl.
CPC ...... G02F 1/133548 (2021.01); *G02B 5/3041* (2013.01)

(56) References Cited

U.S. PATENT DOCUMENTS

| | | | | |
|---|---|---|---|---|
| 2015/0331150 | A1* | 11/2015 | Furholz | B05D 1/305 428/212 |
| 2016/0202553 | A1* | 7/2016 | Jo | G02B 1/18 349/96 |
| 2017/0322418 | A1* | 11/2017 | Lin | H04N 13/344 |

* cited by examiner

POLARIZING PLATE HAVING DISCONTINUOUS WATER-REPELLENT PORTION AND MANUFACTURING METHOD THEREOF

TECHNICAL FIELD

The present disclosure relates to a wire grid polarizing plate and to a method for manufacturing a wire grid polarizing plate.

BACKGROUND ART

Wire grid polarizing plates are highly durable and thus suited for applications such as liquid crystal projectors having high light densities. In such polarizing plates, an important optical property requirement is low reflectance. High reflectance might otherwise cause a liquid crystal panel to malfunction or degrade image quality with stray light.

In recent years, there has been an increased desire for lower reflectances in polarizing plates due to increased brightness and definition in liquid crystal projectors. Wire grid polarizing plates are provided with, for example, a reflective layer, a dielectric layer, and an absorbing layer; reflectance of s-polarized light parallel with the wire grid is suppressed using absorption effects of an upper portion constituted by the dielectric layer and absorbing layer as well as with interference effects of the three layers (for example, see PLT 1).

CITATION LIST

Patent Literature

PLT 1: Japanese Unexamined Patent Application Publication No. 2012-103728

SUMMARY OF INVENTION

Technical Problem

In the above-described wire grid polarizing plate, it is known that durability is improved by coating with a protective film on a surface of lattice-shaped protrusions of a reflective layer, the dielectric layer, and the absorbing layer, and the outermost periphery of a surface of the bottom floor between the lattice-shaped protrusions. However, if the protective film is made thick in order to improve the durability, the optical properties are deteriorated.

The present disclosure has been proposed in view of such circumstances, and provides a polarizing plate having excellent optical properties and durability and a method of manufacturing the polarizing plate.

Solution to Problem

In order to solve the problems described above, the polarizing plate according to the present disclosure includes: a transparent substrate that is transparent to light in a used wavelength band; lattice-shaped protrusions arranged on the transparent substrate at a pitch shorter than the wavelength of the light in the used band, extending in a predetermined direction, and having a reflective layer and a reflection-suppressing layer; a dielectric portion made of a dielectric material formed discontinuously on a surface of the lattice-shaped protrusions and a surface of a bottom floor between the lattice-shaped protrusions; and a water-repellent portion formed on a surface of the dielectric portion and having water-repellent properties.

In addition, a method of manufacturing a polarizing plate according to the present technology includes: film-forming a dielectric material on an optical member including a transparent substrate that is transparent to light in a used wavelength band and a lattice-shaped protrusions arranged on the transparent substrate at a pitch shorter than the wavelength of the light in the used band, extending in a predetermined direction, and having a reflective layer and a reflection-suppressing layer; forming a dielectric portion made of the dielectric material discontinuously on a surface of the lattice-shaped protrusions and a surface of a bottom floor between the lattice-shaped protrusions; and forming a water-repellent portion having water-repellent properties on a surface of the dielectric portion.

According to the present disclosure, since the dielectric portion is discontinuously formed on a surface of the lattice-shaped protrusions and a surface of a bottom floor between the lattice-shaped protrusions, and the water-repellent portion is formed on a surface of the dielectric portion, excellent optical properties and durability can be achieved.

DESCRIPTION OF EMBODIMENTS

Figure 1:
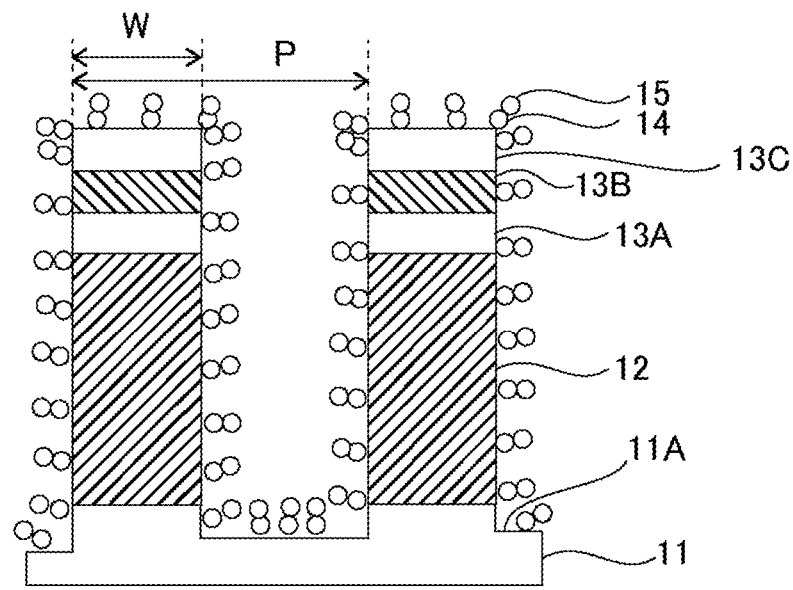
FIG. 1 is a cross-sectional view schematically illustrating a structure of a polarizing plate shown as Embodiment 1.

Hereinafter, embodiments of the present disclosure will be described in detail in the following order with reference to the drawings.

1. Polarizing plate
2. Polarizing plate manufacturing method
3. Examples

1. Polarizing Plate

A polarizing plate according to the present embodiment includes: a transparent substrate that is transparent to light in a used wavelength band; a lattice-shaped protrusions arranged on the transparent substrate at a pitch shorter than the wavelength of the light in the used band, extending in a predetermined direction, and having a reflective layer and a reflection-suppressing layer; a dielectric portion made of a dielectric material formed discontinuously on a surface of the lattice-shaped protrusions and a surface of a bottom floor between the lattice-shaped protrusions; and a water-repellent portion formed on a surface of the dielectric portion and having water-repellent properties. Such a polarizing plate can achieve excellent optical properties and durability since a dielectric portion is discontinuously formed on the surface of the lattice-shaped protrusions and the surface of the bottom floor between the lattice-shaped protrusions, and a water-repellent portion is formed on the surface of the dielectric portion.

The lattice-shaped protrusions have at least a reflective layer and a reflection-suppressing layer. The reflective layer is formed by arranging metal thin films that extend in a striped pattern in the Y direction, which is the absorption axis. The reflective layer thus functions as a wire grid polarizer that, for light propagating toward and entering a surface of the transparent substrate on which the wire grid is formed, attenuates polarized waves (TE waves (s-waves)) having an electric field component in a direction (Y direction) parallel with the lengthwise direction of the wire grid and transmits polarized waves (TM waves (p-waves) having an electric field component in a direction (X direction) perpendicular to the lengthwise direction of the wire grid.

The reflection-suppressing layer attenuates TE waves by having a polarization-selective light-absorbing effect. By appropriately adjusting the configuration of the reflection-suppressing layer, it is possible to partially reflect TE waves reflected by the reflective layer passing through the reflection-suppressing layer so as to return to the reflective layer and to attenuate the light passing through the reflection-suppressing layer via interference. Examples of the reflection-suppressing layer may include a multilayer film of an absorbing layer made of a light absorbing material and a dielectric layer made of a dielectric material or a mixed layer made of a mixture of the light absorbing material and the dielectric material.

An optical member in such a configuration can use four effects of transmission, reflection, interference, and polarization-selective light absorption to attenuate polarized waves (TE waves (s-waves)) having an electric field parallel with the lattice pattern of the reflective layer, and transmit polarized waves (TM waves (p-waves)) having an electric field perpendicular to the lattice pattern. Thus, TE waves are attenuated by the polarization-selective light-absorbing effect of the reflection-suppressing layer, and TE waves transmitted through the reflection-suppressing layer are reflected by the lattice-shaped reflecting layer functioning as a wire grid.

The dielectric portion is discontinuously formed on the surface of the lattice-shaped protrusions and the surface of the bottom floor between the lattice-shaped protrusions. Here, the fact that the dielectric portion is formed discontinuously means that the dielectric film is not uniform, is interrupted in the middle, and does not continue. Examples of the shape of the dielectric portion include an island shape and a dot shape. This configuration can hold the water-repellent portion without deteriorating the optical properties.

The water-repellent portion is preferably formed using a water-repellent compound having a functional group reactive with the dielectric of the dielectric portion. Specifically, this includes a silane compound having a fluoroalkyl group or an alkyl group bonded to $SiO_2$, or a phosphoric acid compound having a fluoroalkyl group or an alkyl group bonded to $Al_2O_3$. This prevents evaporation of the water-repellent compound and improves heat resistance.

Embodiment 1

FIG. 1 is a cross-sectional view schematically illustrating a structure of a polarizing plate shown as an Embodiment 1. As shown in FIG. 1, the polarizing plate is provided with a transparent substrate 11 that is transparent to light in a used wavelength band, lattice-shaped protrusions having a reflective layer 12, a first dielectric layer 13A, an absorbing layer 13B, and a second dielectric layer 13C in this order, and arranged on the transparent substrate at a pitch shorter than the wavelength of light in the used band to extend in a predetermined direction, a dielectric portion 14 made of a dielectric material formed discontinuously on the surface of the lattice-shaped protrusions and the surface of the bottom floor between the lattice-shaped protrusions; and a water-repellent portion 15 formed on the surface of the dielectric portion 14 and having water-repellent properties. That is, the polarizing plate shown in Embodiment 1 has, as reflection-suppressing layers, a first dielectric layer 13A, an absorbing layer 13B, and a second dielectric layer 13C.

The transparent substrate 11 is not particularly limited as long as it is transparent to light in the used band and can be appropriately selected according to the purpose. The phrase "transparent to light of the used band" means that the transparent substrate has a transmittance sufficient to have a transparency allowing functioning as a polarizing plate in the used band of light with the polarizing plate and does not mean a transmittance of 100%. An example of light in the used band is visible light, which has a wavelength of approximately 380 nm to 810 nm.

The reflective layer 12 is formed by arranging metal thin films in a striped pattern extending in the Y direction, which is the absorption axis. Thus, the reflective layer 12 functions as a wire grid polarizer that, for light propagating toward and entering the surface of the transparent substrate 11 on which the wire grid is formed, attenuates polarized waves (TE waves (s-waves)) having an electric field component in a direction (Y direction) parallel with the lengthwise direction of the wire grid and transmits polarized waves (TM waves (p-waves)) having an electric field component in a direction (X direction) perpendicular to the lengthwise direction of the wire grid.

Material for the reflective layer 12 is without particular limitation as long as the material has a reflective property for light in the used band; examples of materials include Al, Ag, Cu, Mo, Cr, Ti, Ni, W, Fe, Si, Ge, and Te, among others, as individual metals or included in a metal alloy or a semiconductor material.

The first dielectric layer 13A is formed, for example, with a film thickness such that, with respect to the phase of the polarized light reflected by the absorbing layer 13B, the phase of the polarized light transmitted through the absorbing layer 13B and reflected by the reflective layer 12 is shifted by half a wavelength. In practice, even if the film thickness is not optimized, the light reflected by the absorbing layer 13B can be absorbed to improve the contrast, so that the thickness may be determined based on the balance between a desired polarization characteristic and an actual manufacturing process.

Examples of materials for first dielectric layer 13A include common materials such as Si oxide such as $SiO_2$, metal oxide such as $Al_2O_3$, beryllium oxide and bismuth oxide, MgF$_2$, cryolite, germanium, titanium dioxide, silicon, magnesium fluoride, boron nitride, boron oxide, tantalum oxide, carbon, or combinations of these materials. Among these, Si oxide is preferably used.

Moreover, the absorbing layer 13B is made of a light absorbing material such as a metal or semiconductor material exhibiting a light absorbing effect and having a refractive index with a non-zero attenuation coefficient and is selected as appropriate according to the light in the used band. Examples of usable metal materials are Ta, Al, Ag, Cu, Au, Mo, Cr, Ti, W, Ni, Fe, and Sn, among others, as individual elements or in an alloy including one or more of these elements. Examples of semiconductors which may be used are Si, Ge, Te, ZnO, and silicide materials (β-FeSi$_2$, MgSi$_2$, NiSi$_2$, BaSi$_2$, CrSi$_2$, CoSi$_2$, and TaSi, among others). Use of these materials can achieve high extinction ratios in a polarizing plate for the applicable visible light region. Among these materials, it is preferable to include Fe or Ta together with Si.

The second dielectric layer 13C can be made of the same material as that of the first dielectric layer 13A, and Si oxide such as SiO$_2$ is preferably used.

The dielectric portion 14 is formed of a dielectric material discontinuously formed on the surface of the lattice-shaped protrusions and the surface of the bottom floor between the lattice-shaped protrusions, and functions as an anchor selectively coupled to the water-repellent portion 15. Examples of dielectric material include common materials such as Si oxide such as SiO$_2$, metal oxide such as Al$_2$O$_3$, beryllium oxide and bismuth oxide, MgF$_2$, cryolite, germanium, titanium dioxide, silicon, magnesium fluoride, boron nitride, boron oxide, tantalum oxide, carbon, or combinations of these materials. Among them, SiO$_2$ or Al$_2$O$_3$ is preferable from the viewpoint of reactivity with the water-repellent compound.

The dielectric portion 14 is preferably formed to have a thickness of 0.8 to 1.2 nm. Thus, the dielectric can be formed in an island shape or a dot shape on the surface of the lattice-shaped protrusions and the surface of the bottom floor between the lattice-shaped protrusions, and the degradation of optical properties can be suppressed.

The water-repellent portion 15 is formed on the surface of the dielectric portion 14 and has water-repellent properties. The water-repellent portion 15 is preferably formed using a water-repellent compound having a functional group that reacts with the dielectric of the dielectric portion 14. This prevents evaporation of the water-repellent compound and improves heat resistance.

Specific water-repellent compounds include silane compounds having fluoroalkyl groups or alkyl groups bonded to SiO$_2$, and the carbon number of the alkyl chain is preferably 4 to 20. Specific examples include FDTS (heptadecafluoro-1,1,2,2-tetrahydrodecyltrichlorosilane), PETS (pentafuorophenylpropyltrichlorosilane), FOTS ((tridecafluoro-1,1,2,2-tetrahydrooctyl) trichlorosilane), and OTS (n-octadecyltrichlorosilane, (C18)). In addition, a phosphoric acid compound having a fluoroalkyl group or an alkyl group bonded to Al$_2$O$_3$ may be used, and the carbon number of the alkyl chain is preferably 4 to 20. Specific examples include FOPA (1H, 1H, 2H, 2H-perfluoro-n-octylphosphonic acid), FDPA (1H, 1H, 2H, 2H-perfluoro-n-decylphosphonic acid), FHPA (1H, 1H, 2H, 2H-perfluoro-n-hexylphosphonic acid), and ODPA (octadecylphosphonic acid).

According to the polarizing plate having such a configuration, since the dielectric portion 14 is discontinuously formed on the surface of the lattice-shaped protrusions and the surface of the bottom floor between the lattice-shaped protrusions, and the water-repellent portion 15 is formed on the surface of the dielectric portion 14, excellent optical properties and durability can be obtained.

Embodiment 2

Figure 2:
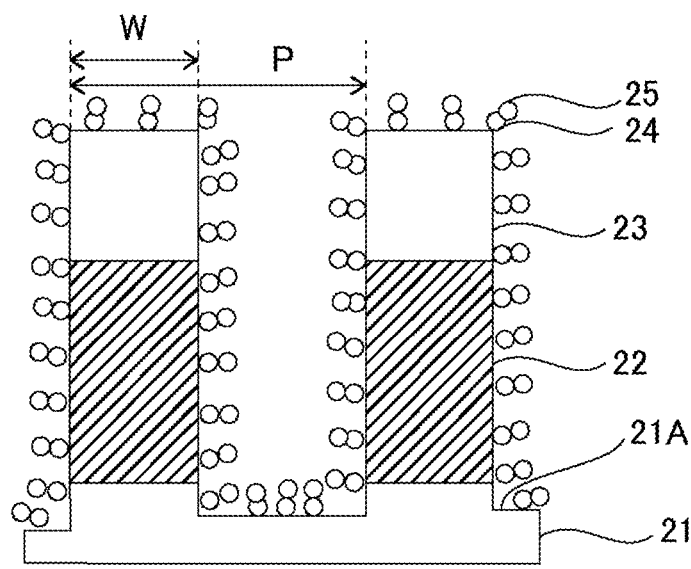
FIG. 2 is a cross-sectional view schematically illustrating a structure of a polarizing plate shown as Embodiment 2.

FIG. 2 is a cross-sectional view schematically illustrating the structure of a polarizing plate shown as Embodiment 2. The polarizing plate shown in FIG. 2 is provided with a transparent substrate 21 that is transparent to light in a used wavelength band; a lattice-shaped protrusions arranged on the transparent substrate at a pitch shorter than the wavelength of the light in the used wavelength band, extending in a predetermined direction, and having a reflective layer 22 and a mixed layer 23 in which a light-absorbing material and a dielectric are mixed; a dielectric portion 24 made of a dielectric material formed discontinuously on the surface of the lattice-shaped protrusions and the surface of the bottom floor between the lattice-shaped protrusions; and a water-repellent portion 25 formed on the surface of the dielectric portion 24 and having water-repellent properties. That is, the polarizing plate shown in Embodiment 2 has the mixed layer 23 in which a light absorbing material and a dielectric are mixed as a reflection-suppressing layer.

The transparent substrate 21, the reflective layer 22, the dielectric portion 24, and the water-repellent portion 25 are the same as those of the transparent substrate 11, the reflective layer 12, the dielectric portion 14, and the water-repellent portion 15 of the polarizing plate shown in Embodiment 1 described above, and therefore their descriptions are omitted here.

The mixed layer 23 is formed by mixing a light absorbing material and a dielectric, and has a concentration distribution in which, for example, the concentration of the light absorbing material or the dielectric is inclined in the thickness direction.

Examples of the light absorbing material include a metal material, a semiconductor material, among other materials which are suitably selected according to light in the used band. Examples of usable metal materials are Ta, Al, Ag, Cu, Au, Mo, Cr, Ti, W, Ni, Fe, and Sn, among others, as individual elements or in an alloy including one or more of these elements. Examples of semiconductors which may be used are Si, Ge, Te, ZnO, and silicide materials (β-FeSi$_2$, MgSi$_2$, NiSi$_2$, BaSi$_2$, CrSi$_2$, CoSi$_2$, and TaSi, among others). Use of these materials can achieve high extinction ratios in a polarizing plate for the applicable visible light region. Among these materials, it is preferable to include Fe or Ta together with Si.

Examples of dielectric material include common materials such as Si oxide such as SiO$_2$, metal oxide such as Al$_2$O$_3$, beryllium oxide and bismuth oxide, MgF$_2$, cryolite, germanium, titanium dioxide, silicon, magnesium fluoride, boron nitride, boron oxide, tantalum oxide, carbon, or combinations of these materials. Among these, Si oxide is preferably used.

Modified Example

Although the lattice-shaped protrusions are provided on the transparent substrate in the above-described Embodiments 1 and 2, the present invention is not limited thereto, and a dielectric layer may be further provided on the transparent substrate to form the lattice-shaped protrusions on the dielectric layer. Alternatively, the transparent substrate or the dielectric layer may be trenched to form a convex pedestal, and lattice-shaped protrusions may be formed on the pedestal. The cross-sectional shape of the pedestal is not limited to a rectangle shape, and may be, for example, a trapezoidal shape or a curved shape.

2. Manufacturing Method of Polarizing Plate

Next, a method of manufacturing a polarizing plate according to the present embodiment will be described. A method of manufacturing a polarizing plate according to the present embodiment includes: film-forming a dielectric material on an optical member comprising a transparent substrate that is transparent to light in a used wavelength band and a lattice-shaped protrusions arranged on the transparent substrate at a pitch shorter than the wavelength of the light in the used band, extending in a predetermined direction, and having a reflective layer and a reflection-suppressing layer; forming a dielectric portion made of the dielectric material discontinuously on a surface of the lattice-shaped protrusions and a surface of a bottom floor between the lattice-shaped protrusions; and forming a water-repellent portion having water-repellent properties on a surface of the dielectric portion. This method of manufacturing a polarizing plate can achieve excellent optical properties and durability by forming a dielectric portion discontinuously on the surface of the lattice-shaped protrusions and the surface of the bottom floor between the lattice-shaped protrusions, and forming a water-repellent portion on the surface of the dielectric portion.

Figure 3:
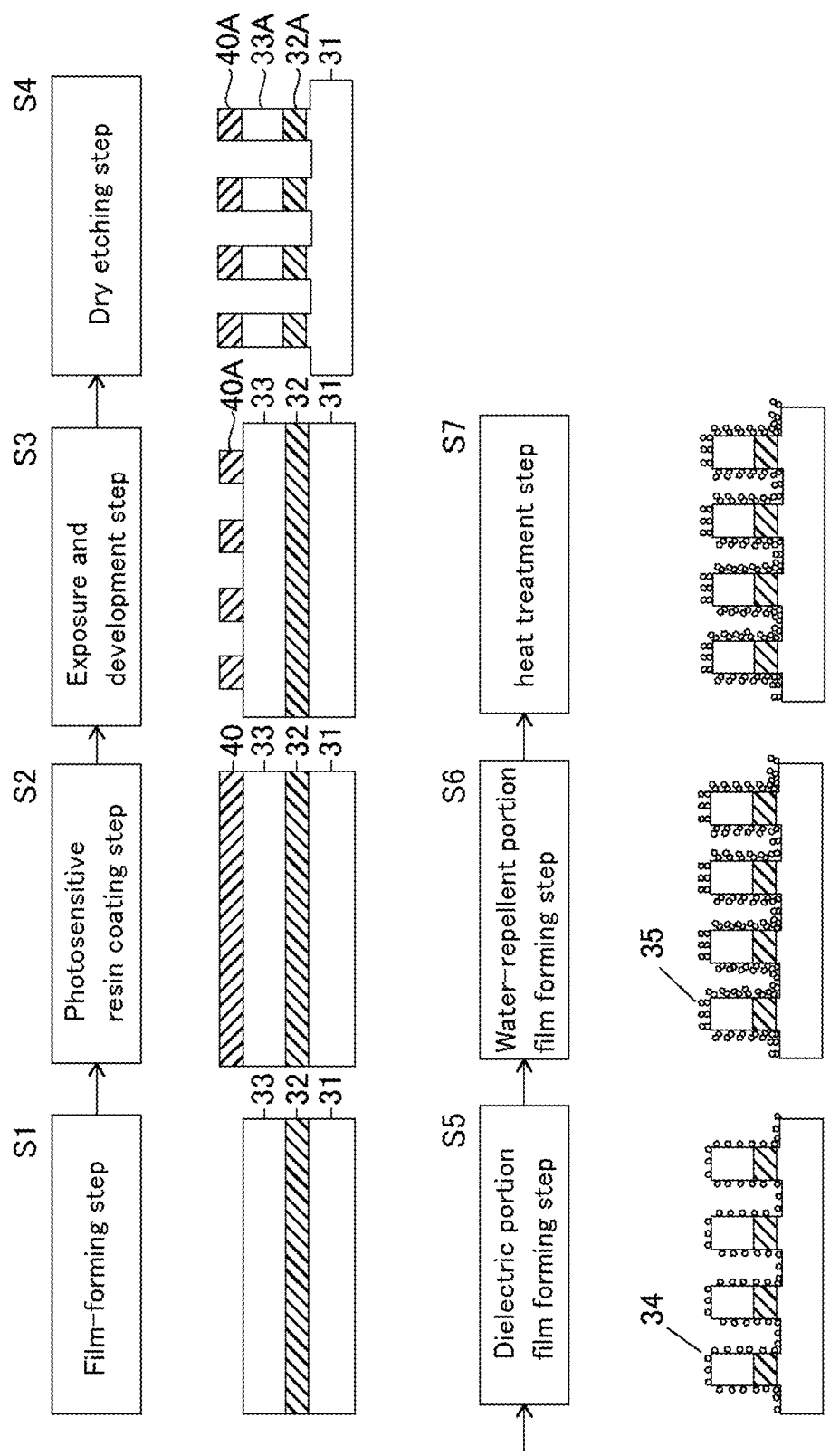
FIG. 3 is a flow chart showing a method of manufacturing a polarizing plate.

FIG. 3 is a flowchart showing a method of manufacturing a polarizing plate. First, in a film-forming step S1, a reflective layer 32 and a reflection-suppressing layer 33 are laminated on a transparent substrate 31 by, for example, a sputtering method. Next, a photosensitive resin 40 is applied as a resist (photosensitive resin coating step S2), exposure and development are performed, and a lattice-shaped pattern 40A of the resist is formed (exposure and development step S3).

Next, in a dry etching step S4, a grid pattern by a resist is transferred to the lower reflective layer 32 and the reflection-suppressing layer 33 to form a grid of the reflective layer 32A and the reflection-suppressing layer 33A. Since the reflective layer 32 and the reflection-suppressing layer 33 are different materials and have different etching properties, it is preferable to change the etching gas in accordance with the material. For example, when aluminum is employed for the reflective layer 32, a chlorine-based plasma is preferably used, and when $SiO_2$ or FeSi is employed for the reflection-suppressing layer 33, a fluorine-based plasma is preferably used. When $Al_2O_3$ is employed, $BCl_3$ is preferably used. By using different etching gases depending on the material, it is possible to prevent the cross-sectional shape of the boundary of the material from being disturbed due to the difference in etchability, and it is possible to suppress the degradation of optical properties.

Next, in a dielectric portion film forming step S5, a dielectric portion 34 is discontinuously formed on a surface of the lattice-shaped protrusions where the reflective layer 32A and the reflection-suppressing layer 33A are formed and on a surface of a bottom floor between the lattice-shaped protrusions. The dielectric portion 34 can be formed by physical vapor deposition or chemical vapor deposition, among other method. Among these methods, ALD method (Atomic Layer Deposition or Atomic Deposition) is particularly preferable. As a result, even in the trench structure having a high aspect ratio, the dielectric can be uniformly adhered to the details of the trench.

Next, in a water-repellent portion film forming step S6, a water-repellent compound is applied to a surface of the dielectric portion 34. Examples of the coating method of the water-repellent compound include dip coating, spin coating, and vapor treatment. Among these, it is particularly preferable to use a vapor treatment. Thus, the water-repellent compound can be applied to the details of the trench structure having a high aspect ratio.

Next, in a heat treatment step S7, a heat treatment is performed to bond the dielectric portion 34 and the water-repellent compound, to form the water-repellent portion 35 having water-repellent property on a surface of the dielectric portion 34, and to evaporate and remove the water-repellent compound adhering to portions other than the dielectric portion. The temperature of the heat treatment is preferably 250 to 350° C., more preferably 280 to 320° C.

According to such a method of manufacturing a polarizing plate, even in a trench structure having a high aspect ratio, the dielectric portion and the water-repellent portion can be formed discontinuously, and a polarizing plate having excellent optical properties and durability can be obtained.

EXAMPLES

3. Examples

Examples of the present disclosure will be described below. The present disclosure is not limited to these examples.

Simulation

First, in the wire grid polarizing plate, the effect of the thickness of $SiO_2$ formed on a surface of the lattice-shaped protrusions and a surface of a bottom floor between the lattice-shaped protrusions was simulated.

Figure 4:
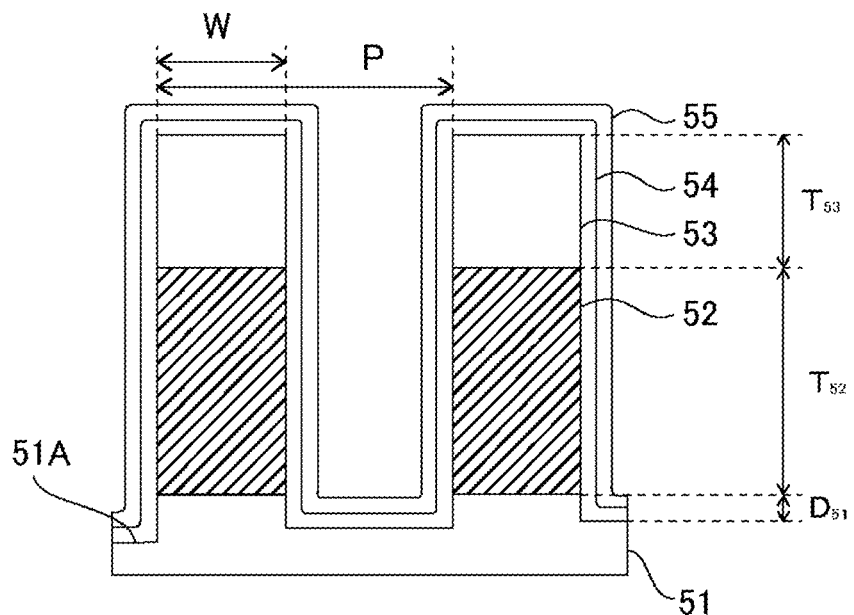
FIG. 4 is a cross-sectional view schematically illustrating a structure of a wire grid polarizing plate to be simulated.

FIG. 4 is a sectional view schematically illustrating a structure of a wire grid polarizing plate for performing simulation. The polarizing plate shown in FIG. 4 is provided with a transparent substrate 51, a reflective layer 52 made of Al having a width W of 35 nm arranged on the substrate 51 at a pitch P of 141 nm, and a mixed layer 53 formed on the reflective layer 52 and made of $SiO_2$ and FeSi in which the concentration of FeSi increases from the reflective layer 52 in the thickness direction. The depth $D_{51}$ of the trench 51A of the substrate 51 is 25 nm, the thickness $T_{52}$ of the reflective layer 52 is 250 nm, and the thickness $T_{53}$ of the mixed layer 53 is 34 nm. On the surface of the lattice-shaped protrusions and the surface of the bottom floor between the lattice-shaped protrusions, $SiO_2$ having a predetermined thickness (0, 1, 2, 5, 10 nm) as the dielectric portion 54 and FDTS (trichloro (1H, 1H, 2H, 2H-heptadecafluorodecyl) silane) having a thickness of 1 nm as the water-repellent portion 55 are provided.

The simulation was performed by electromagnetic field simulation using the RCWA (Rigorous Coupled Wave Analysis) method. A grating simulator "Gsolver" manufactured by Grating Solver Development was used for the simulation.

Figure 5:
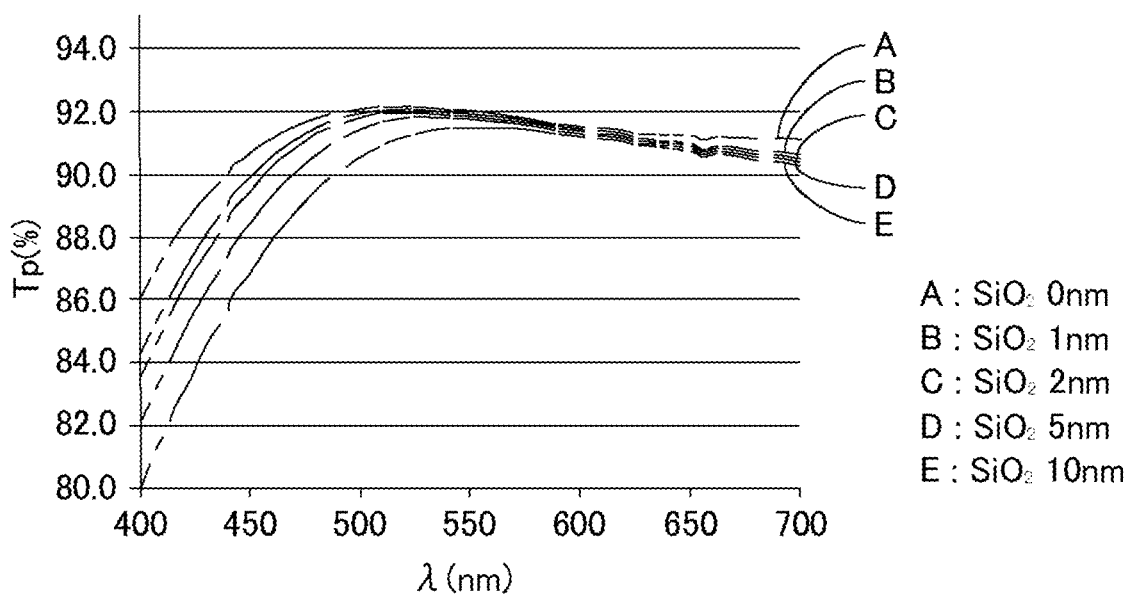
FIG. 5 is a graph showing simulation results of transmission axis transmittance Tp when $SiO_2$ having a predetermined thickness (0, 1 nm, 2 nm, 5 nm, 10 nm) is formed as a dielectric portion.
Figure 6:
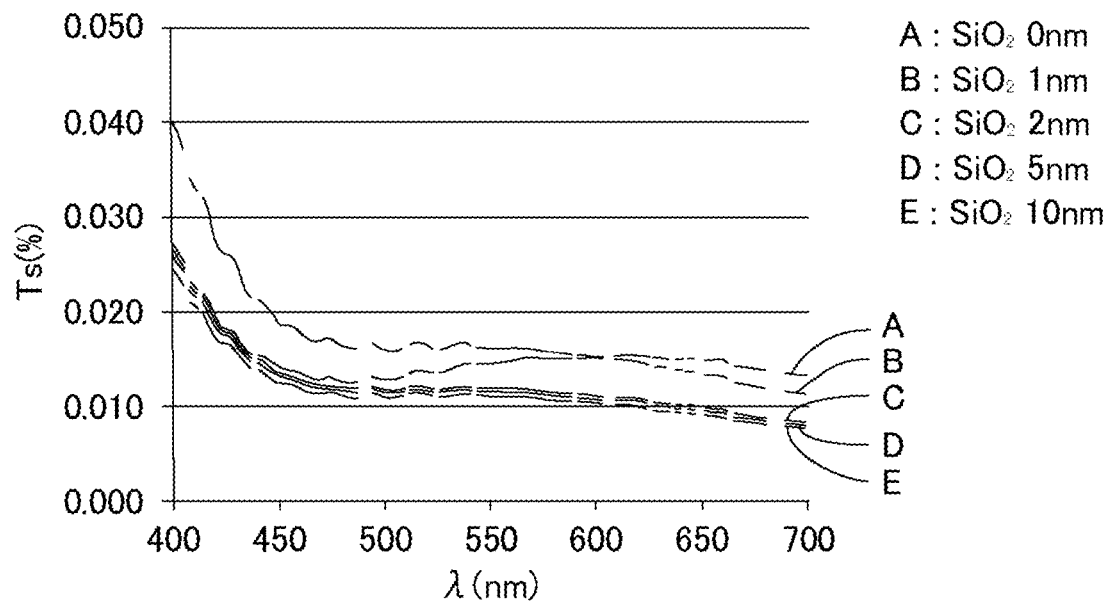
FIG. 6 is a graph showing simulation results of absorption axis transmittance Ts when $SiO_2$ having a predetermined thickness (0, 1 nm, 2 nm, 5 nm, 10 nm) is formed as a dielectric portion.
Figure 7:
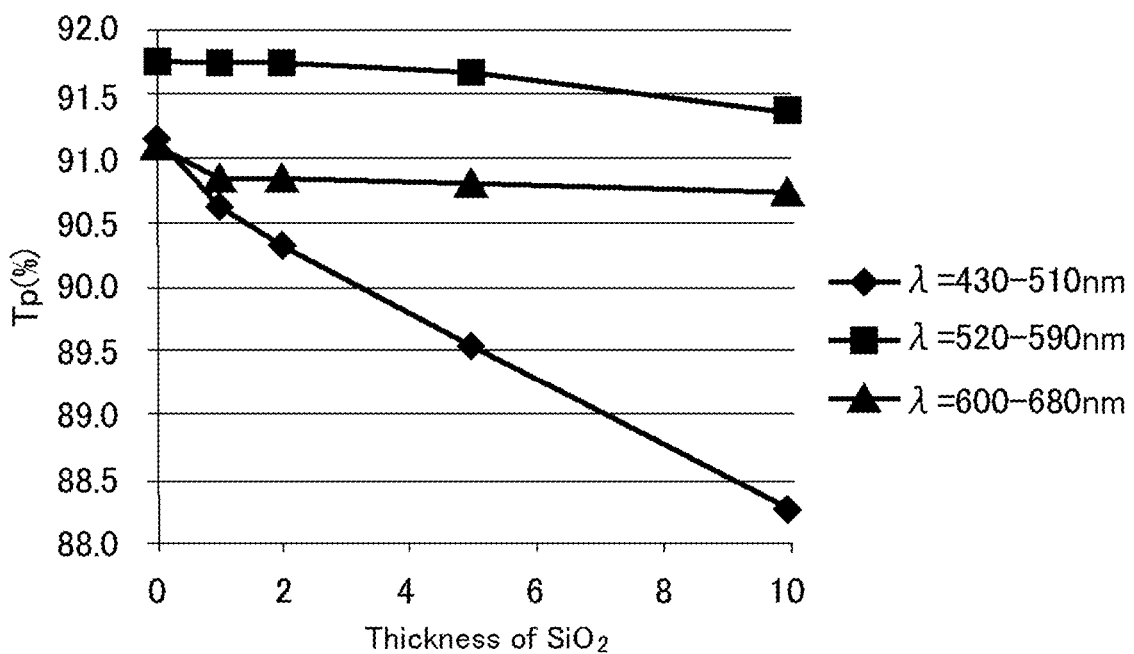
FIG. 7 is a graph showing simulation results of the average value of transmission axis transmittance Tp of each wavelength band with respect to the thickness of $SiO_2$.
Figure 8:
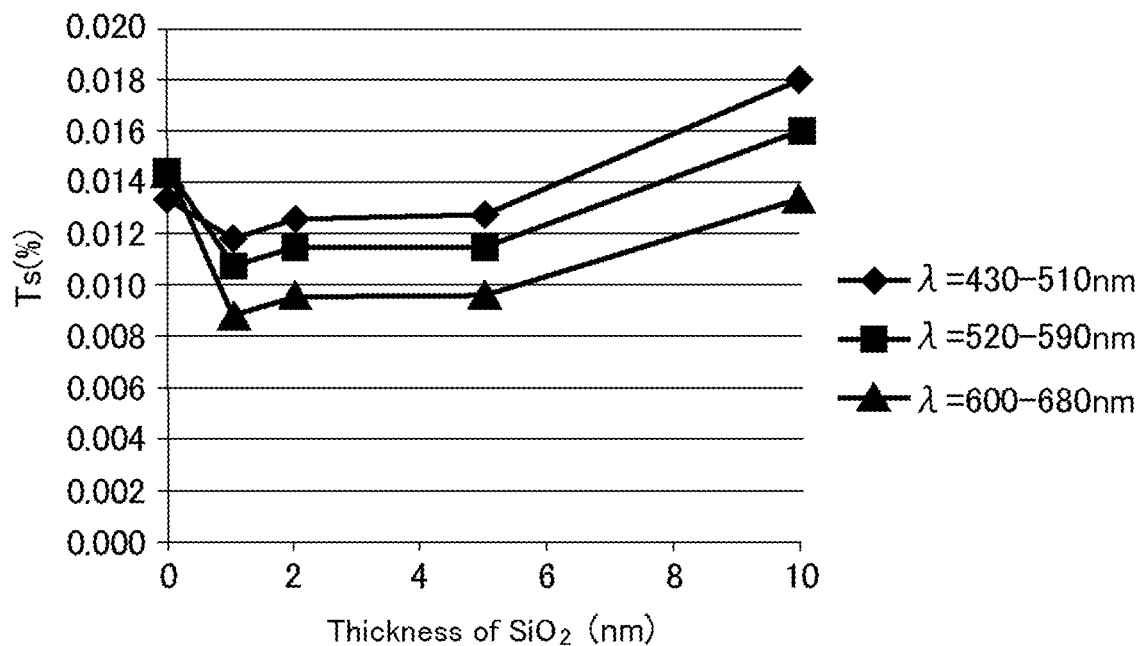
FIG. 8 is a graph showing simulation results of the average value of absorption axis transmittance Ts of each wavelength band with respect to the thickness of $SiO_2$.

FIG. 5 is a graph showing simulation results of transmission axis transmittance Tp when $SiO_2$ having a predetermined thickness (0, 1 nm, 2 nm, 5 nm, 10 nm) is formed as a dielectric portion, and FIG. 6 is a graph showing simulation results of absorption axis transmittance Ts when $SiO_2$ having a predetermined thickness (0, 1 nm, 2 nm, 5 nm, 10 nm) is formed as a dielectric portion. FIG. 7 is a graph showing the simulation result of the average value of the transmission axis transmittance Tp of each wavelength band with respect to the thickness of $SiO_2$, and FIG. 8 is a graph showing the simulation result of the average value of absorption axis transmittance Ts of each wavelength band with respect to the thickness of $SiO_2$. It should be noted that the transmission axis transmittance Tp is a transmittance in a direction perpendicular to the grid, and the absorption axis transmittance Ts is a transmittance in a direction parallel with the grid.

As shown in FIGS. 5 and 7, it was found that the transmission axis transmittance Tp decreases as the thickness of $SiO_2$ increases, especially in the blue wavelength band (wavelength: 430 to 510 nm). As shown in FIGS. 6 and 8, it was found that the absorption axis transmittance Ts decreases in the green wavelength band (wavelength: 520 to 590 nm) and the red wavelength band (wavelength: 600 to 680 nm) when the thickness of $SiO_2$ is 1 nm, 2 nm, and 5 nm, as compared to when the thickness of $SiO_2$ is 0 nm. It was also found that when the thickness of $SiO_2$ was 10 nm, it was higher in the blue wavelength band (wavelength: 430 to 510 nm) and the green wavelength band (wavelength: 520 to 590 nm) as compared to when the thickness of $SiO_2$ was 0 nm. From these simulation results, it was found that when the thickness of $SiO_2$ is about 1 nm, the transmission axis transmittance Tp is high, the absorption axis transmittance Ts is low, and good optical properties are obtained.

Preparation of a Polarizing Plate

Next, a polarizing plate on which a $SiO_2$ film having a predetermined thickness (0.8 nm, 1.0 nm, 1.2 nm, 10 nm) was formed as a dielectric portion was prepared, and heat resistance and boiling resistance were evaluated. The contact angle of the material constituting the polarizing plate was also examined.

Figure 9:
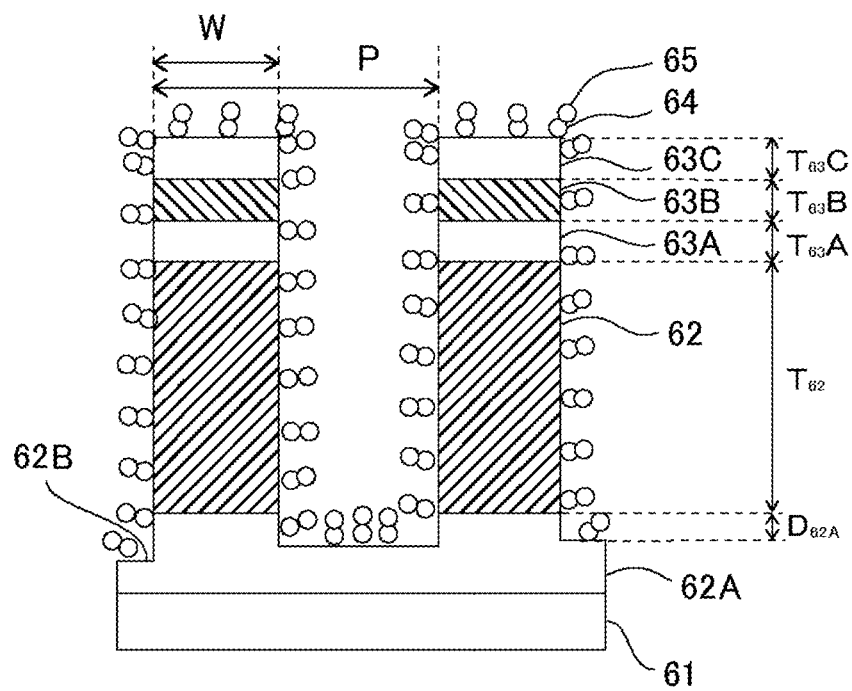
FIG. 9 is a cross-sectional view schematically illustrating a structure of a polarizing plate prepared in an experiment.

FIG. 9 is a cross-sectional view schematically illustrating a structure of a polarizing plate prepared in the experiment. As shown in FIG. 9, the polarizing plate comprises a transparent substrate 61, a reflective layer backing layer 62A made of $SiO_2$ on the transparent substrate 61, a reflective layer 62 made of Al having a width W of 35 nm arranged at a pitch P of 141 nm on the reflective layer backing layer 62A, a first dielectric layer 63A made of $SiO_2$, an absorbing layer 63B made of FeSi, and a second dielectric layer 63C made of $SiO_2$, which are arranged on the reflective layer 62. The thickness of the reflective layer backing layer 62A was 80 nm, the depth $D_{62A}$ of the trench 62B of the reflective layer backing layer 62A was 25 nm, the thickness $T_{62}$ of the reflective layer 62 was 250 nm, the thickness $T_{63A}$ of the first dielectric layer 63A was 5 nm, the thickness $T_{63B}$ of the absorbing layer 63B was 25 nm, and the thickness $T_{63C}$ of the second dielectric layer 63C was 10 nm. Then, on the surface of the lattice-shaped protrusions and the surface of the bottom floor between the lattice-shaped protrusions, $SiO_2$ having a predetermined thickness (0.8 nm, 1.0 nm, 1.2 nm, 10 nm) was formed as the dielectric portion 64 by the ALD method, and FDTS having a thickness of about 1 nm was formed as the water-repellent portion 65 by the vapor treatment.

Figure 10:
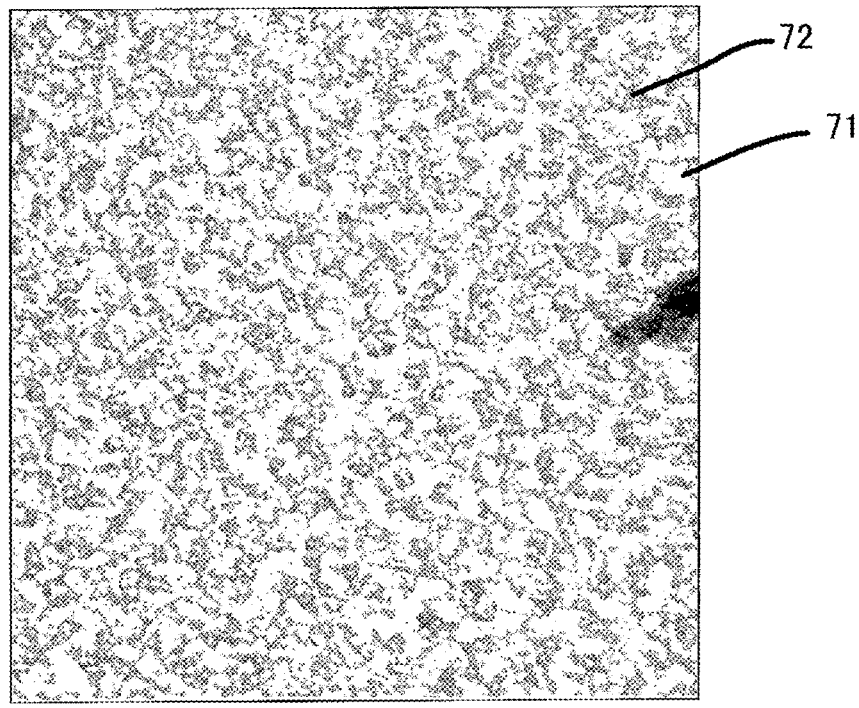
FIG. 10 is a TEM (Transmission Electron Microscope) image of a 1 nm $SiO_2$ film formed on a carbon film by an ALD method.

FIG. 10 is a TEM (Transmission Electron Microscope) image of a 1 nm $SiO_2$ film formed on a carbon film by the ALD method. Since it is difficult to observe the dielectric portion formed on the polarizing plate, $SiO_2$ was formed on the carbon film to simulate the present state of the dielectric portion on the polarizing plate. In FIG. 10, it was found that the white portion 71 was made of carbon and the black portion 72 was made of $SiO_2$, and $SiO_2$ was deposited in the form of islands. From FIG. 10, it is considered that when $SiO_2$ is formed to a thickness of 0.8 to 1.2 nm, a discontinuous $SiO_2$ film is formed instead of a uniform film.

Heat Resistance

A heat resistance test was conducted at 250° C. The contrast (transmission axis transmittance/absorption axis transmittance) of each polarizing plate after the heat resistance test was measured, and the rate of change in contrast from before the heat resistance test was calculated.

Figure 11:
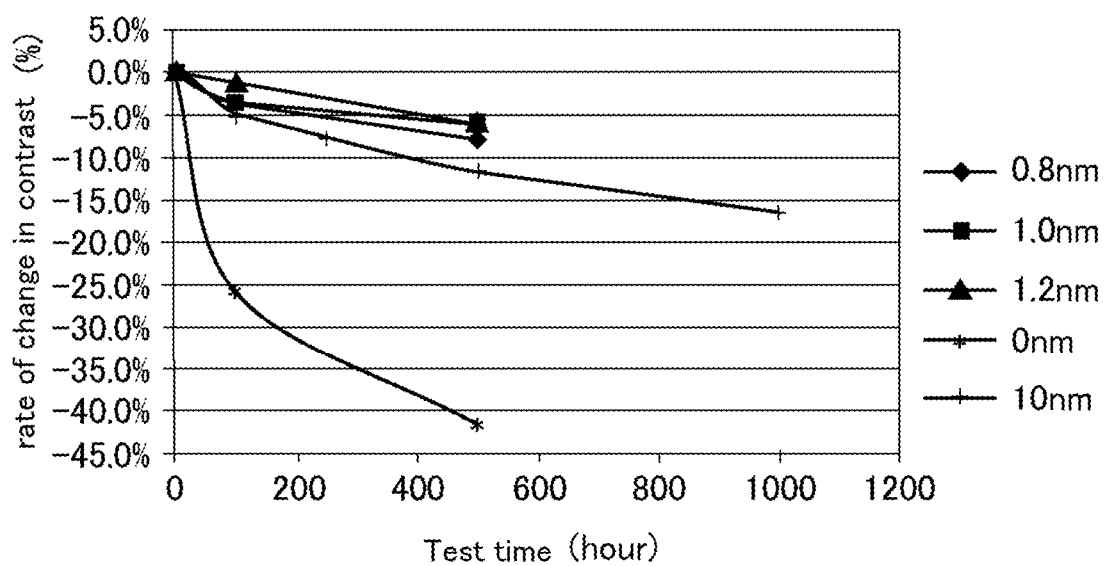
FIG. 11 is a graph showing the rate of change in contrast with respect to the test time of a heat resistance test.

FIG. 11 is a graph showing the rate of change in contrast with respect to the test time of the heat resistance test. As shown in FIG. 11, when $SiO_2$ was not formed, the rate of change in contrast increased with a short test time, and the rate of change was about 40% with a test time of 500 hours. On the other hand, when $SiO_2$ films having thicknesses of 0.8 nm, 1.0 nm, and 1.2 nm were formed, the rate of change was 10% or less even during a test period of 500 hours. From the above, it was found that when a 0.8 to 1.2 nm $SiO_2$ film was formed, heat resistance equivalent to that of a conventional 10 nm film was exhibited while maintaining excellent optical properties.

Contact Angle of Each Material

Next, the effect of the presence or absence of $SiO_2$ film as a dielectric on the contact angle after the water-repellent treatment of each material constituting the polarizing plate was examined.

Table 1 shows contact angles at the initial stage and after heat treatment when water-repellent treatment was performed without forming $SiO_2$ film. After each material was formed on a substrate (EAGLE XG manufactured by Corning), FDTS was formed by a vapor treatment. The heat treatment was performed at a temperature of 300° C. for 16 hours.

TABLE 1

|  | contact angles (°) after water-repellent treatment | contact angles (°) after heat treatment (300° C., 16 hours) |
| --- | --- | --- |
| Al film | 113 | 12 |
| $SiO_2$ film | 114 | 112 |
| Substrate (EAGLE XG) | 110 | 64 |
| FeSi(90%), $SiO_2$(10%) film | 97 | 4 |
| FeSi(80%), $SiO_2$(20%) film | 105 | 4 |
| FeSi(70%), $SiO_2$(30%) film | 107 | 4 |

As shown in Table 1, the Al film, the substrate, and the FeSi film had high initial contact angles after the water-repellent treatment and exhibited water-repellent properties, but after the heat treatment, water-repellent properties disappeared because FDTS evaporated. In contrast, it has been found that the $SiO_2$ film exhibits water-repellent properties without the water-repellent agent evaporating since FDTS and $SiO_2$ are bonded to each other.

Table 2 shows the contact angles at the initial stage and after the heat treatment when the $SiO_2$ film is formed and treated with water-repellent treatment. After each material was formed on a substrate (EAGLE XG manufactured by Corning), $SiO_2$ having a predetermined thickness was formed by the ALD method, and FDTS was formed by the vapor treatment. Further, in the polarizing plate shown in FIG. 9, SiO$_2$ having a predetermined thickness was formed by the ALD method, and FDTS was formed by the vapor treatment. Heat treatment was performed at a temperature of 300° C. for 16 hours.

TABLE 2

|  | SiO$_2$ film thickness (nm) | contact angles (°) after water-repellent treatment | contact angles (°) after heat treatment (300° C., 16 hours) |
| --- | --- | --- | --- |
| Al film | 0.5 | 110 | 87 |
| Al film | 1.0 | 111 | 108 |
| Al film | 3.0 | 108 | 111 |
| FeSi film | 0.5 | 114 | 117 |
| FeSi film | 1.0 | 114 | 117 |
| FeSi film | 3.0 | 101 | 117 |
| Substrate (EAGLE XG) | 0.5 | 108 | 106 |
| Substrate (EAGLE XG) | 1.0 | 108 | 109 |
| Substrate (EAGLE XG) | 3.0 | 105 | 109 |
| polarizing plate | 0.5 | 150 | 116 |
| polarizing plate | 1.0 | 150 | 150 |
| polarizing plate | 3.0 | 150 | 150 |

It was found from Table 2 that FDTS and SiO$_2$ were bonded by forming SiO$_2$ films on all the materials, and FDTS exhibited water-repellent properties without evaporation.

From the above, it has been found that by forming a film of SiO$_2$ as a dielectric portion by about 1 nm, specifically by 0.8 to 1.2 nm, and forming a water-repellent portion, good durability can be obtained while maintaining excellent optical properties.

REFERENCE SIGNS LIST

11 transparent substrate, 12 reflective layer, 13A first dielectric layer, 13B absorbing layer, 13C second dielectric layer, 14 dielectric portion, 15 water-repellent portion, 21 transparent substrate, 22 reflective layer, 23 mixed layer, 24 dielectric portion, 25 water-repellent portion, 31 transparent substrate, 32 reflective layer, 33 reflection-suppressing layer, 34 dielectric portion, 35 water-repellent portion, 40 photosensitive resin, 51 transparent substrate, 52 reflective layer, 53 mixed layer, 54 dielectric portion, 55 water-repellent portion, 61 transparent substrate, 62A reflective layer backing layer, 62 reflective layer, 63A first dielectric layer, 63B absorbing layer, 63C second dielectric layer, 64 dielectric portion, 65 water-repellent portion, 71 carbon, 72 SiO$_2$

The invention claimed is:

1. A polarizing plate comprising:
   a transparent substrate that is transparent to light in a used wavelength band;
   lattice-shaped protrusions arranged on the transparent substrate at a pitch shorter than the wavelength of the light in the used band, extending in a predetermined direction, and having a reflective layer and a reflection-suppressing layer;
   a dielectric portion in which a discontinuous dielectric material is deposited on a surface of the lattice-shaped protrusions and is deposited on a surface of a bottom floor between the lattice-shaped protrusions, the discontinuous dielectric material being deposited such that:
   the dielectric material is present as a first plurality of island shapes or dot shapes on the surface of the lattice-shaped protrusions, and
   the dielectric material is present as a second plurality of island shapes or dot shapes on the surface of the bottom floor between the lattice-shaped protrusions; and
   a discontinuous water-repellent portion in which a water-repellent compound is applied and attached to each island shape or dot shape of the dielectric material.

2. The polarizing plate according to claim 1, wherein the dielectric portion is made of SiO$_2$, and
   wherein the water-repellent portion is made of a silane compound having a fluoroalkyl group or an alkyl group.

3. The polarizing plate according to claim 1, wherein the dielectric portion is made of Al$_2$O$_3$, and
   wherein the water-repellent portion is made of a phosphoric acid compound having a fluoroalkyl group or an alkyl group.

4. The polarizing plate according to claim 1, wherein the dielectric portion has a thickness of 0.8 to 1.2 nm.

5. The polarizing plate according to claim 4, wherein the dielectric portion is made of SiO$_2$, and
   wherein the water-repellent portion is made of a silane compound having a fluoroalkyl group or an alkyl group.

6. The polarizing plate according to claim 4, wherein the dielectric portion is made of Al$_2$O$_3$, and
   wherein the water-repellent portion is made of a phosphoric acid compound having a fluoroalkyl group or an alkyl group.

7. A manufacturing method of a polarizing plate comprising:
   film-forming a dielectric material on an optical member comprising a transparent substrate that is transparent to light in a used wavelength band and lattice-shaped protrusions arranged on the transparent substrate at a pitch shorter than the wavelength of the light in the used band, extending in a predetermined direction, and having a reflective layer and a reflection-suppressing layer;
   forming a dielectric portion
   by depositing the dielectric material on a surface of the lattice-shaped protrusions in a discontinuous manner such that a first plurality of island shapes or dot shapes is present on the surface of the lattice-shaped protrusions and
   by depositing the dielectric material on a bottom floor between the lattice-shaped protrusions in a discontinuous manner such that a second plurality of island shapes or dot shapes is present on the surface of a bottom floor between the lattice-shaped protrusions; and
   forming a discontinuous water-repellent portion in which a water-repellent compound is applied and attached to each island shape or dot shape of the dielectric material.

8. The manufacturing method according to claim 7, wherein the dielectric material is formed on the optical member by an ALD method.

* * * * *